US012769520B2

(12) United States Patent
Ur et al.

(10) Patent No.: US 12,769,520 B2
(45) Date of Patent: Oct. 20, 2026

(54) AUTOCOMPLETE APPARATUS, AUTOCOMPLETE METHOD AND PROGRAM

(71) Applicant: NTT, Inc., Tokyo (JP)

(72) Inventors: Shmuel Ur, Galil (IL); Ziv Glazberg, Ramat Gan (IL); Ran Lehr, Tel-Aviv (IL); Erez Keinan, Rishon Le-zion (IL)

(73) Assignee: NTT, Inc., Tokyo (JP)

( * ) Notice: Subject to any disclaimer, the term of this patent is extended or adjusted under 35 U.S.C. 154(b) by 192 days.

(21) Appl. No.: 18/566,636

(22) PCT Filed: Jun. 7, 2021

(86) PCT No.: PCT/JP2021/021566
§ 371 (c)(1),
(2) Date: Dec. 2, 2023

(87) PCT Pub. No.: WO2022/259310
PCT Pub. Date: Dec. 15, 2022

(65) Prior Publication Data

US 2024/0264805 A1 Aug. 8, 2024

(51) Int. Cl.
*G06F 8/33* (2018.01)
*G06F 8/51* (2018.01)

(52) U.S. Cl.
CPC . *G06F 8/33* (2013.01); *G06F 8/51* (2013.01)

(58) Field of Classification Search
CPC .......... G06F 8/33
See application file for complete search history.

(56) References Cited

U.S. PATENT DOCUMENTS

| | | | | |
|---|---|---|---|---|
| 9,116,672 | B2 * | 8/2015 | Muir | G06F 8/33 |
| 9,471,286 | B2 * | 10/2016 | Yuen | G06F 8/33 |
| 10,339,221 | B2 * | 7/2019 | Colic | G06F 40/295 |
| 10,983,760 | B2 * | 4/2021 | Guan | G06N 5/01 |
| 11,573,771 | B2 * | 2/2023 | Nupponen | G06N 7/01 |
| 11,604,628 | B2 * | 3/2023 | Ni | G06F 8/33 |
| 12,039,295 | B2 * | 7/2024 | Allamanis | G06F 8/33 |
| 12,125,010 | B2 * | 10/2024 | Dreyfus | G06F 3/0485 |
| 2014/0173563 | A1 * | 6/2014 | Dias | G06F 8/74 717/123 |
| 2016/0350290 | A1 | 12/2016 | Fujiwara et al. | |
| 2018/0024816 | A1 * | 1/2018 | Au | G06F 8/33 717/108 |
| 2018/0349103 | A1 * | 12/2018 | Brown | G06N 20/00 |
| 2018/0349114 | A1 * | 12/2018 | Brown | G06F 8/427 |

(Continued)

FOREIGN PATENT DOCUMENTS

JP 2016218995 A 12/2016

OTHER PUBLICATIONS

Guo, Zifan Carl, and William S. Moses. "Enabling transformers to understand low-level programs." 2022 IEEE High Performance Extreme Computing Conference (HPEC). IEEE, 2022.*

(Continued)

*Primary Examiner* — Francisco J Aponte

(57) ABSTRACT

An autocomplete apparatus includes a memory and a processor configured to output a suggestion of a low-level language code corresponding to a high-level language code when a programmer converts the high-level language code into the low-level language code; and perform learning based on whether the suggestion is adopted by the programmer.

6 Claims, 4 Drawing Sheets

MATLAB(INPUT)

```
if (w > 1200 || h > 400 || h * w > 100000)
    % 1st thing to do: taking only smaller relevent area.
    if  (isBigSizeImages)
        right = w;
        leftOffset = 1;
    elseif (clickX + widthHalf < w && clickX > widthHalf)
        right = clickX + widthHalf;
        leftOffset = clickX - widthHalf;
    else
        right = w;
        leftOffset = 1;
    end
end
```

Net(C#)Auto-Complete

```
if (w > 1200 || h > 400 || h * w > 100000)
{
    // 1st thing to do: taking only smaller relevant area.
    if (isBigSizeImages)
    {
         right = w - 1;
         leftOffset = 0;
    }
    else if (clickX + widthHalf < w && clickX > widthHalf)
    {
       right = clickX + widthHalf;
       leftOffset = clickX - widthHalf;
    }
    else
    {
       right = w - 1;
       leftOffset = 0;
    }
}
```

(56) References Cited

U.S. PATENT DOCUMENTS

| | | | | |
|---|---|---|---|---|
| 2019/0303107 | A1* | 10/2019 | Kelly | G06F 9/453 |
| 2020/0097261 | A1* | 3/2020 | Smith | G06F 40/174 |
| 2020/0380415 | A1* | 12/2020 | Siracusa | G06N 3/08 |
| 2021/0157553 | A1* | 5/2021 | Ligman | G06F 18/22 |
| 2021/0303447 | A1* | 9/2021 | Haze | G06N 20/00 |
| 2021/0318865 | A1* | 10/2021 | Farivar | G06F 8/41 |
| 2022/0222165 | A1* | 7/2022 | Garg | G06F 11/3428 |
| 2023/0010808 | A1* | 1/2023 | Nguyen | G06F 8/71 |

OTHER PUBLICATIONS

Barath, Boris, William Knottenbelt, and Thomas Heinis. "Improving code completion with machine learning." Imperial College London (2020).*

Imam, Ayad Tareq, and Ayman Jameel Alnsour. "The use of natural language processing approach for converting pseudo code to C# code." Journal of Intelligent Systems 29.1 (2019): 1388-1407.*

Ingrid Lunden (2020) "Codota picks up $12M for an AI platform that auto-completes developers' code" @ 2013-2021, Verizon Media. All rights reserved. Powered by WordPress VIP [online] website: https://techcrunch.com/2020/04/27/codota-picks-up-12m-for-an-ai-platform-that-auto-completes-developers-code/.

Lachaux et al. (2020) "Unsupervised Translation of Programming Languages" Sep. 22, 2020, v3 [online] Accessed on Jul. 12, 2021, website: <URL: https://arxiv.org/pdf/2006.03511.pdf>, particularly, chapters 3,4.

Yamauchi et el. (2017) "Automatic Corpora Generation for Machine Translation" particularly, "4. Learning from user feedback, Panasonic Technical Journal, vol. 63, No. 1, May 2017.

* cited by examiner

Fig. 3

MATLAB(INPUT)

```
if (w > 1200 || h > 400 || h * w > 100000)
    % 1st thing to do: taking only smaller relevent area.
    if  (isBigSizeImages)
         right = w;
         leftOffset = 1;
    elseif (clickX + widthHalf < w && clickX > widthHalf)
         right = clickX + widthHalf;
         leftOffset = clickX - widthHalf;
    else
         right = w;
         leftOffset = 1;
    end
end
```

Net(C#)Auto-Complete

```
if (w > 1200 || h > 400 || h * w > 100000)
{
    // 1st thing to do: taking only smaller relevant area.
    if (isBigSizeImages)
    {
        right = w - 1;
        leftOffset = 0;
    }
    else if (clickX + widthHalf < w && clickX > widthHalf)
    {
       right = clickX + widthHalf;
       leftOffset = clickX - widthHalf;
    }
    else
    {
       right = w - 1;
       leftOffset = 0;
    }
}
```

AUTOCOMPLETE APPARATUS, AUTOCOMPLETE METHOD AND PROGRAM

CROSS-REFERENCE TO RELATED APPLICATIONS

This application is a U.S. 371 Application of International Patent Application No. PCT/JP2021/021566, filed on 7 Jun. 2021, the disclosure of which is hereby incorporated herein by reference in its entirety.

TECHNICAL FIELD

The present invention relates to an autocomplete technology that automatically complements a character string to be input in software development.

BACKGROUND ART

Software development, particularly coding in a low-level language close to a machine language, is very difficult, and enormous operations and language proficiency are required.

Therefore, a software development method called mix and match is used in which a code is created in a high-level language and then the code is converted into a code in a low-level language. A code of a low-level language may be referred to as a production code.

In the mix and match method, the entire code having portions of a code of a high-level language and portions of a code of a low-level language can be executed. The entire code can be executed and efficient development can be performed.

CITATION LIST

Non-Patent Literature

Non-Patent Literature 1: "Codota picks up $12M for an AI platform that auto-completes developers' code" https://techcrunch.com/2020/04/27/codota-picks-up-12m-for-an-ai-platform-that-auto-completes-developers-code/

SUMMARY OF INVENTION

Technical Problem

As described above, in the mix-and-match method, after a code of a high-level language is developed, the code is converted into a code of a low-level language. However, in order to achieve conversion into an appropriate code, considerable time is required, and there is a possibility that many code syntax bugs are included. For example, in a case where an element of an array starts at index 1 in Matlab, conversion to .NET/C needs to start at index 0, and such conversion can include a mistake.

There is a case where a code of a high-level language already exists and only syntax conversion to a low-level language is outsourced. However, even if a technology of auto-completing a character string of a code being created is applied with an AI tool having affinity for the syntax, productivity improvement is considered to remain at about 25% (Non-Patent Literature 1).

The present invention has been made in view of the above points, and an object thereof is to provide a technology of improving productivity of operations of converting a code of a high-level language into a code of a low-level language.

Solution to Problem

According to the disclosed technology, an autocomplete apparatus is provided that includes:

an autocomplete unit that outputs a suggestion of a low-level language code corresponding to a high-level language code when a programmer converts the high-level language code into the low-level language code; and a learning unit that causes the autocomplete unit to learn based on whether the suggestion is adopted by the programmer.

Advantageous Effects of Invention

According to the disclosed technology, it is possible to improve productivity of operations of converting a code of a high-level language into a code of a low-level language.

BRIEF DESCRIPTION OF DRAWINGS

FIG. 3 illustrates a display example at the time of autocomplete processing.

DESCRIPTION OF EMBODIMENTS

Hereinafter, an embodiment of the present invention (present embodiment) will be described with reference to the drawings. The embodiment to be described below is merely an example, and an embodiment to which the present invention is applied is not limited to the following embodiment. In the following description, unless otherwise specified, "code" and "program" are used synonymously. That is, "code" in the following description may be replaced with "program".

Overview of Embodiment

In the present embodiment, in the development of the code using the mix and match method, the autocomplete apparatus as described later estimates the "intention" of a programmer when converting a code of a high-level language into a code of a low-level language, and suggests the code of a low-level language corresponding to the code of the high-level language. The speed and quality of code creation can be improved by the estimation processing.

More specifically, the autocomplete apparatus learns specifications of a high-level language using a syntax of a code of a high-level language or the like, and learns coding of a low-level language by the programmer. When a programmer performs a new conversion operation, the autocomplete apparatus generates and displays a suggestion of a code of a low-level language based on a code of a high-level language. The programmer determines whether to use the suggestion, and the determination is fed back to learning. The unit of the suggestion is not limited to a specific unit, and may be a suggestion of a character string of a part of a certain line or a suggestion for conversion of the entire code snippet.

(Device Configuration Example)

Figure 1:
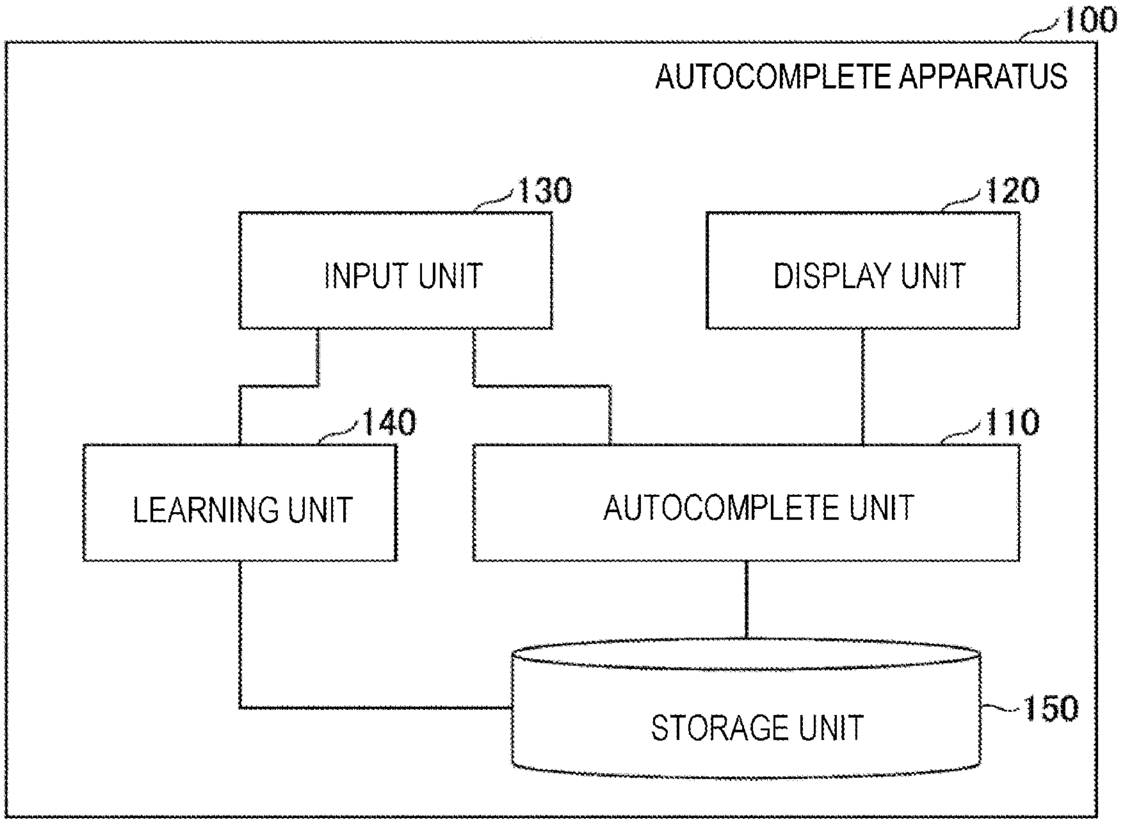
FIG. 1 is a configuration diagram of an autocomplete apparatus according to an embodiment of the present invention.

FIG. 1 illustrates a configuration example of an autocomplete apparatus 100 according to the present embodiment. As illustrated in FIG. 1, the autocomplete apparatus 100 includes an autocomplete unit 110, a display unit 120, an input unit 130, a learning unit 140, and a storage unit 150.

The autocomplete unit 110 suggests a low-level language code corresponding to a high-level language code to be converted, using a machine learning method. The method of the machine learning is not limited to a specific method, and a neural network such as DNN may be used, for example. An agent that is trained by the machine learning method to output a suggestion of a low-level language code may be referred to as a "model". That is, the autocomplete unit 110 may be referred to as a model.

The display unit 120 displays a screen serving as an interface with the user. The screen includes suggestions and the like by the autocomplete unit 110. The input unit 130 receives an input from a user. The input is, for example, an input indicating whether to adopt the suggestion by the autocomplete unit 110.

The learning unit 140 causes the autocomplete unit 110 to perform learning. For example, in a case where the autocomplete unit 110 has a model of a neural network, the learning unit 140 performs learning of the model (parameter adjustment and the like) using a method such as an error back propagation method.

The storage unit 150 stores, for example, parameters of the autocomplete unit 110 (model), a code of a high-level language to be converted, a result of whether a suggestion input via the input unit 130 is adopted, and the like.

The autocomplete apparatus 100 may be physically configured by one device (computer) or may be configured by a plurality of devices connected to a network. For example, the autocomplete apparatus 100 may include a terminal including the input unit 130 and the display unit 120, and a server including the autocomplete unit 110, the learning unit 140, and the storage unit 150. The server may be a virtual machine on a cloud.

(Operation Example of Autocomplete Apparatus 100)

Figure 2:
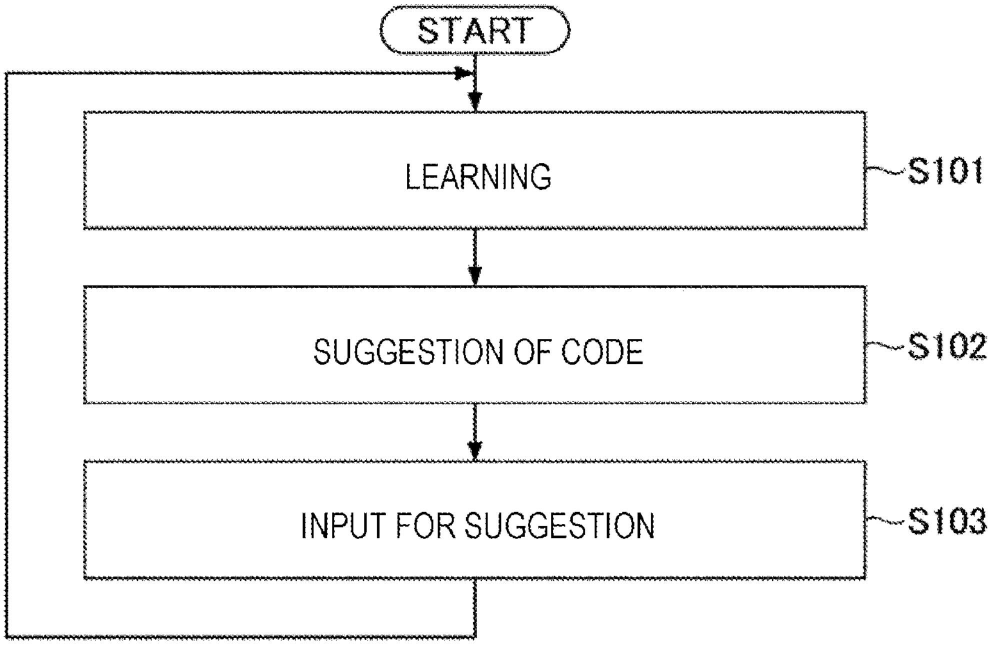
FIG. 2 is a diagram for explaining a processing procedure performed by the autocomplete apparatus.

Next, an operation example of the autocomplete apparatus 100 will be described along the procedure of the flowchart illustrated in FIG. 2.

<S101: Learning>

In S101, as preliminary preparation, the learning unit 140 causes the autocomplete unit 110 to learn a code of a high-level language and a code of a low-level language. For example, specification of syntax of a high-level language and specification of syntax of a low-level language are input via the input unit 130, and the learning unit 140 performs learning so that the autocomplete unit 110 understands the syntax of the high-level language and the syntax of the low-level language.

A learning method is not limited to a specific method. For example, a code of a high-level language and a code of a low-level language corresponding to the code of the high-level language may be input, and the autocomplete unit 110 may perform learning so as to output a code of a correct low-level language for the code of the high-level language that has been input.

The autocomplete apparatus 100 may learn coding of the low-level language performed by a specific programmer. For example, the autocomplete apparatus 100 may learn in a manner that, by displaying a code of a high-level language on the display unit 120 and repeatedly inputting by a programmer a code of a low-level language corresponding to the code of the high-level language via the input unit 130, the autocomplete unit 110 can output the code of a low-level language corresponding to the code of the high-level language, the code of a low-level language being coded by the programmer.

The unit of the repetition described above is not limited to a specific unit. For example, learning may be performed by repeatedly displaying a module including a plurality of lines of code of a high-level language and creating and inputting a module of a low-level language corresponding to the module, or learning may be performed by repeatedly displaying a single-line code of a high-level language and creating and inputting a code of a low-level language corresponding to the code.

The learning described above can be achieved, for example, by the learning unit 140 adjusting parameters of the autocomplete unit 110 (model) such that the autocomplete unit 110 (model) outputs a code of a correct low-level language.

The learning described above may be performed in a plurality of types of low-level languages for one high-level language. The autocomplete unit 110 that has learned in a plurality of types of low-level languages for one high-level language can identify the type of the low-level language from a part of the low-level language code input from the programmer and can suggest a code of a correct type of low-level language in actual conversion operation.

<S102: Suggestion of Code>

An operation of converting a code of a certain high-level language into a code of a low-level language is started. For example, it is assumed that a code of a high-level language to be converted is stored in the storage unit 150. The autocomplete unit 110 reads the code of the high-level language to be converted from the storage unit 150, and displays the code of the high-level language to be converted via the display unit 120. The unit to be displayed is not limited to a specific unit. As an example, a module including a plurality of lines is displayed.

The programmer performing the operation starts inputting the code of the low-level language corresponding to the code of the high-level language displayed on the display unit 120. The code of the low-level language input by the programmer is displayed on the display unit 120 and is input to the autocomplete unit 110.

For example, the autocomplete unit 110 identifies, based on a start portion of the line of the code input by the programmer, which line of the high-level language to be converted the line corresponds to, and outputs (suggests) the line of the low-level language corresponding to the identified line via the display unit 120. That is, in this case, the autocomplete unit 110 outputs the suggestion at the timing when the programmer starts inputting the line of the low-level language code.

In the example described above, an example of making a suggestion in units of lines is illustrated, but the unit of making a suggestion is not limited to lines. The unit for making a suggestion may be a character string (for example, functions, arguments of functions, and the like) of a portion in a line or a code (also referred to as a module) of a group of a plurality of lines. FIG. 3 illustrates an example of display. The upper side of FIG. 3 is the high-level language code to be converted, and the lower side is the code of the converted low-level language.

The autocomplete unit 110 may not make a suggestion in a case where an unlearned code in a high-level language is a conversion target.

<S103: Input for Suggestion>

The programmer who has seen the suggestion by the autocomplete unit 110 determines whether to adopt (accept) the suggestion, and inputs the determined result from the input unit 130. The determined result is passed from the input unit 130 to the learning unit 140 and the autocomplete unit 110.

For example, when the determined result is "suggestion is adopted", the autocomplete unit 110 decides the suggestion as a code of a low-level language corresponding to a code of a high-level language. When the determined result is "suggestion is not adopted", the autocomplete unit 110 displays another suggestion. Alternatively, if there is no other suggestion, a display is made to prompt the programmer to create the code without any suggestion.

The result of whether the suggestion is adopted determined by the programmer is also input to the learning unit 140. The learning unit 140 learns the autocomplete unit 110 based on a result of whether the suggestion is adopted for the suggestion. Specifically, for example, in a case where a suggestion for a certain high-level language code is not adopted, the learning unit 140 adjusts the parameters of the autocomplete unit 110 so as to lower the probability and priority of making the suggestion for the high-level language code. For example, in a case where a suggestion for a certain high-level language code is adopted, the learning unit 140 adjusts the parameters of the autocomplete unit 110 so as to perform the suggestion with high probability for the high-level language code.

(Hardware Configuration Example of Device)

The autocomplete apparatus 100 can be implemented, for example, by causing a computer to execute a program. This computer may be a physical computer, or may be a virtual machine on a cloud.

That is, a program corresponding to processing performed by the autocomplete apparatus 100 is executed by use of hardware resources such as a CPU and a memory built in a computer, so that the autocomplete apparatus 100 can be implemented. The above program can be stored and distributed by being recorded in a computer-readable recording medium (portable memory or the like). The above program can also be provided through a network such as the Internet or an electronic mail.

Figure 4:
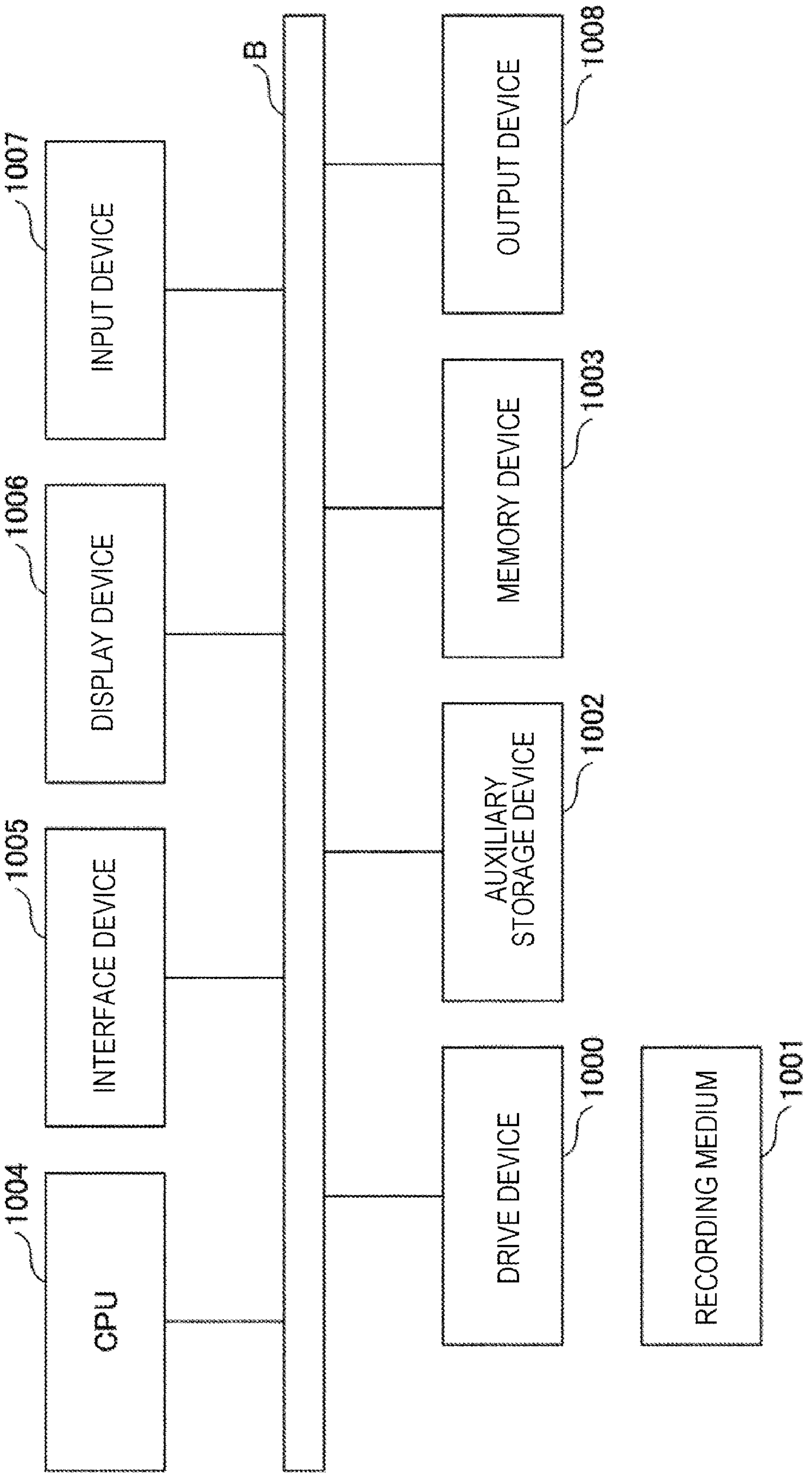
FIG. 4 is a diagram illustrating a hardware configuration example of the autocomplete apparatus.

FIG. 4 is a diagram illustrating a hardware configuration example of the computer. The computer in FIG. 4 includes a drive device 1000, an auxiliary storage device 1002, a memory device 1003, a CPU 1004, an interface device 1005, a display device 1006, an input device 1007, an output device 1008, and the like, which are connected to each other by a bus BS.

The program for implementing processing in the computer is provided through a recording medium 1001 such as a CD-ROM or a memory card, for example. When the recording medium 1001 storing the program is set in the drive device 1000, the program is installed from the recording medium 1001 into the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is made, the memory device 1003 reads the program from the auxiliary storage device 1002, and stores the program therein. The CPU 1004 implements a function related to the autocomplete apparatus 100 in accordance with the program stored in the memory device 1003. The interface device 1005 is used as an interface for connection to a network, various external devices, and the like. The display device 1006 displays a graphical user interface (GUI) or the like according to the program. The input device 1007 includes a keyboard and a mouse, buttons, a touch panel, or the like, and is used to input various operation instructions. The output device 1008 outputs a calculation result.

Effects of Embodiment

As described above, according to the technology according to the present embodiment, the code of the high-level language and the code of the low-level language after conversion corresponding to the code of the high-level language are learned, and when the programmer converts the high-level language into the low-level language, the code of the low-level language is suggested based on the learning, and the adoption/rejection of the suggestion result by the programmer is reflected in the learning. Therefore, productivity by autocomplete can be further enhanced.

Since the coding for a specific programmer can be learned, it is also possible to adapt a code suggestion to a specific programmer.

Summary of Embodiment

The present specification discloses at least the autocomplete apparatus, the autocomplete method, and the program described in the following clauses.

(Clause 1)

An autocomplete apparatus including:

an autocomplete unit that outputs a suggestion of a low-level language code corresponding to a high-level language code when a programmer converts the high-level language code into the low-level language code, and a learning unit that causes the autocomplete unit to learn based on whether the suggestion is adopted by the programmer.

(Clause 2)

The autocomplete apparatus according to clause 1, in which the learning unit causes the autocomplete unit to learn a high-level language code and a corresponding low-level language code as preliminary preparation.

(Clause 3)

The autocomplete apparatus according to clause 2, in which the learning unit causes the autocomplete unit to learn the low-level language code created for the high-level language code by a specific programmer.

(Clause 4)

The autocomplete apparatus according to any one of clauses 1 to 3, in which the autocomplete unit outputs the suggestion at a timing when the programmer starts inputting a line of the low-level language code.

(Clause 5)

An autocomplete method performed by a device including an autocomplete unit, the autocomplete method including:

a step of outputting by the autocomplete unit a suggestion of a low-level language code corresponding to a high-level language code when a programmer converts the high-level language code into the low-level language code; and a step of causing the autocomplete unit to learn based on whether the suggestion is adopted by the programmer.

(Clause 6)

A program for causing a computer to function as each unit in the autocomplete apparatus according to any one of clauses 1 to 4.

Although the present embodiment has been described above, the present invention is not limited to such a specific embodiment, and various modifications and changes can be made within the scope of the gist of the present invention described in the claims.

REFERENCE SIGNS LIST

100 Autocomplete apparatus
110 Autocomplete unit
120 Display unit
130 Input unit
140 Learning unit
150 Storage unit
1000 Drive device
1001 Recording medium
1002 Auxiliary storage device
1003 Memory device
1004 CPU
1005 Interface device
1006 Display device
1007 Input device
1008 Output device

The invention claimed is:

1. An autocomplete apparatus comprising:

a memory; and a processor configured to:

receiving a learning model;

output a suggestion of a machine code language code corresponding to a high-level language code when a programmer converts the high-level language code into the machine code, wherein the machine code comprises low-level language code; and perform learning based on whether the suggestion is adopted by the programmer.

2. The autocomplete apparatus according to claim 1, wherein the processor performs learning the high-level language code and the machine code corresponding to the high-level language code as preliminary preparation.

3. The autocomplete apparatus according to claim 2, wherein the processor performs learning the machine code created for the high-level language code by a specific programmer.

4. The autocomplete apparatus according to claim 1, wherein the processor outputs the suggestion at a timing when the programmer starts inputting a line of the machine code.

5. An autocomplete method performed by a device including a memory and a processor, the autocomplete method comprising:

receiving a learning model;

outputting a suggestion of a machine code language code corresponding to a high-level language code when a programmer converts the high-level language code into the low-level language code machine code, wherein the machine code comprises; and performing learning based on whether the suggestion is adopted by the programmer.

6. A non-transitory computer-readable recording medium having computer-readable instructions stored thereon, which, when executed, cause a computer to function as the autocomplete apparatus according to claim 1.

* * * * *